March 20, 1962   D. C. GALBRAITH   3,026,145
VEHICLE SEAT ASSEMBLAGE
Filed Dec. 2, 1958

INVENTOR.
D. C. GALBRAITH
BY
Lieber, Lieber & Nilles
ATTORNEYS

United States Patent Office 3,026,145
Patented Mar. 20, 1962

3,026,145
VEHICLE SEAT ASSEMBLAGE
Donald C. Galbraith, Milwaukee, Wis., assignor to Milsco Manufacturing Company, Milwaukee, Wis., a corporation of Wisconsin
Filed Dec. 2, 1958, Ser. No. 777,660
4 Claims. (Cl. 297—455)

The present invention relates generally to improvements in the art of producing safe and comfortable seat structures, and it relates more specifically to improvements in the construction of seat assemblages especially adapted for use on vehicles such as tractors or the like.

The primary object of the invention is to provide an improved seat which is durable in structure, comfortable in use, and flexible in adaptation.

Some of the more specific objects and advantages of the present invention are as follows:

To provide a simple but sturdy contour seat of unitary sheet-metal construction, which is devoid of jagged and sharp exposed edges tending to tear garments or to injure individuals using the structure.

To provide a simple seat particularly adapted for use on rough riding vehicles, which may be provided with one or more independently and readily renewable cushioning or shock absorbing pads.

To provide a simple seat assemblage comprising a relatively rigid contour shell and one or more cushion pads attachable to the shell, so that the user may either employ the shell alone or with one or more of the pads applied thereto.

To provide an improved sheet-metal vehicle seat provided with a protective peripheral edging strip which also serves to properly position and to protect the edges of detachable cushioning pads carried by the shell.

To provide a sheet-metal contour seat and pad assemblage which is effectively ventilated and drained so as to eliminate moisture deposits and to maintain the seat in dry condition even when exposed to the elements.

To provide a seat structure which is properly shaped and which may be locally padded at one or more zones so as to insure maximum comfort for the occupant.

To provide an improved seating unit especially adapted for use on tractors, or the like, which can be produced at moderate cost and applied to various types of supports or mountings.

These and other more specific objects and advantages of the invention will be apparent from the following detailed description.

A clear conception of the several features constituting the present improvement, and of the construction and usage of a typical commercial vehicle seat assemblage embodying the invention, may be had by referring to the drawing accompanying and forming a part of this specification wherein like reference characters designate the same or similar parts in the various views.

Figure 1:
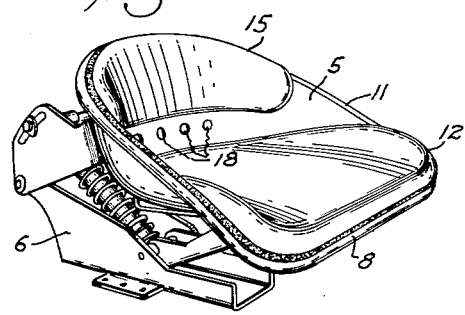
FIGURE 1 is a side and front perspective view of a complete seat assemblage attached to a relatively standard mounting device.
Figure 2:
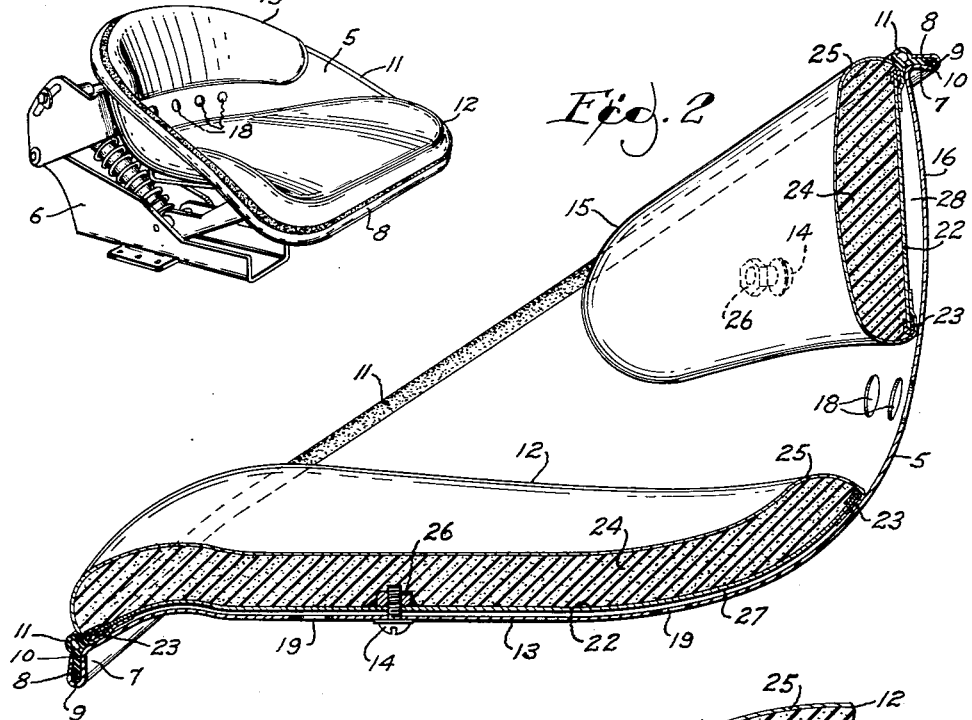
FIGURE 2 is an enlarged central longitudinal vertical section through the seat assemblage alone comprising the sheet-metal shell and two cushion pads secured thereto.

While the invention has been illustrated and described herein as having been embodied in a typical tractor seat assemblage, it is not intended to confine the use of the improved features to such specific assemblages; and it is also contemplated that descriptive terms employed herein be given the broadest possible interpretation consistent with the disclosure.

Referring to the drawing, the improved seat assemblage shown therein, comprises in general a unitary shell 5 of sheet metal or other suitable distortable sheet material adapted to be firmly secured to mounting structure 6 in any suitable manner and having an edge wall 7 and a flange 8 forming a continuous U-shaped recess 9 extending entirely around the shell periphery; an elongated flexible strip 10 normally clamped by the wall 7 and flange 8 within the shell recess 9 and preferably having an outer enlarged bead or edge portion 11 disposed outwardly beyond the recess 9; a dished lower cushion or pad 12 secured to the bottom 13 of the shell 5 by one or more screws 14 and preferably abutting the lower front part of the enlarged strip portion 11; and a laterally curved upper back rest cushion or pad 15 likewise secured to the back 16 of the shell 5 by several similar screws 14 and preferably abutting the upper rear part of the enlarged strip portion 11.

The shell 5 may be formed of a single blank of relatively heavy sheet-metal distorted into seating contour shape in any desired manner and is preferably provided with a series of ventilating holes 18 in its rear wall 16, and with several drainage openings 19 in its bottom 13. The extreme outer edge 20 of the shell flange 8 is often rather sharp due to the shearing action of the dies, and after the shells 5 have been formed they may be degreased and painted or otherwise finished to meet customer's specifications.

The elongated protective strip 10 may be formed of relatively soft rubber or any other rather flexible material, and is also preferably provided with an enlarged inner bead or edge portion 21. Both of the enlarged upper and lower edge portions 11, 21 of the strip 10 may also be formed tubular or hollow as shown in FIGURE 3 in order to facilitate firm clamping of the lower part of the strip within the recess 9, and embedment of the extreme outer edge 20 of the shell 5 within the soft strip directly beneath the upper bead portion 11.

Figure 3:
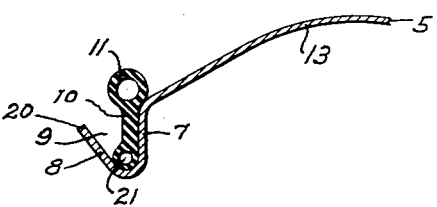
FIGURE 3 is a further enlarged fragmentary similar section through the lower front portion of the sheet-metal shell alone, showing the manner in which the flexible protective strip is initially applied to the peripheral shell recess.
Figure 4:
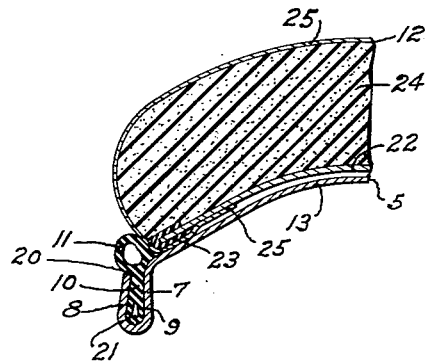
FIGURE 4 is a similarly enlarged and fragmentary section through the lower front portion of the finally assembled shell and bottom cushion pad.

In order to most effectively confine and clamp the lower part of the strip 10 within the shell recess 9, this recess may be initially formed of transverse V-shaped cross-section as in FIGURE 3, whereupon the elongated strip may be readily set into the V-shaped recess in snug engagement with the wall 7. The flange 8 may then be pressed against the strip 10 with sufficient force to collapse the lower bead portion 21 and to firmly clamp the body of the strip between the wall 7 and flange 8 while also embedding and concealing the flange edge 20 beneath the upper enlarged bead portion 11 as in FIGURE 4.

While the shells 5 when thus constructed may be applied and attached to mounting structure 6 of any desired type, to be used without the addition of cushions or pads, either dished lower pads 12 or curved upper pads 15, or both, may be applied to enhance the seating comfort. As shown, these pads 12, 15 are of improved construction each comprising a relatively thin and resilient sheet-metal backing plate 22 formed to correspond with the adjacent contour of the shell 10 and having a U-shaped extrusion 23 of rubber or the like cemented around its peripheral edge; a relatively thick cushion 24 of medium density foam rubber or the like cemented to the base plate 22 and to the adjacent flange of the extrusion 23; and a durable sheet 25 of covering material such as elastic vinyl coacting with the cushion 24 and having its edge portions folded inwardly and cemented to the other flange of the extrusion 23 and to the back of the plate 22.

Each of the backing plates 22 also has one or more nuts 26 welded thereon in alinement with adjacent apertures in the shell 10 through which the attaching screws 14 may be applied when the corresponding pad 12, 15 has been properly positioned within the shell 10 with its outer edge portion snugly engaging the adjacent enlarged bead portion 11 of the protective strip, and the extrusion strip 23 and the inwardly folded edge portion of the covering sheet 25 form ridges coacting with the adjacent surface of the shell 10 to provide spaces 27, 28 between the pads 12, 15 and the shell respectively which augment the resiliency and comfort of the cushions. In order to permit proper drainage of moisture from within the shell 10 when the pad 12 is installed the strip 23 and the edge of the sheet 25 coacting therewith and with the inner shell surface about this lower pad is preferably locally interrupted at selected places in an obvious manner, thereby providing drainage passages communicable with the openings 19 in the shell bottom.

When the various parts of the improved seat assemblage have been properly constructed as described, the contour shells 5 may be used alone without pads, whereupon the outer portion 11 of the protective peripheral strips 10 will merely serve to protect the users against possible injury by the sharp shell edges 20, and the rear holes 18 will serve to ventilate while the bottom openings 19 will serve to drain the shell 5. If a user desires to have additional comfort, he may readily apply either the lower cushioning pad 12, or the rear cushioning pad 15, or both with the aid of the screws 14 and nuts 26; and in such cases the outer bead or enlarged portion 11 of the strip 10 will also function to properly position the pads 12, 15 with the nuts 26 in alinement with the screw receiving apertures in the shell 5. With both pads 12, 15 applied the vertical spacing of these pads will still provide ventilation through the holes 18, and the two pads may be independently applied or removed.

From the foregoing detailed description of the construction and usage of the device, it should be apparent that the present invention in fact provides an improved seat assemblage which is durable and comfortable in structure and flexible in its adaptations. The improved seat unit while being especially adapted for use on vehicles and exposed to inclement weather, may be utilized with utmost safety for other purposes, and the contour shells 5 may be compactly stacked or nested for storage purposes. The seating pads 12, 15 may be removed and renewed when worn independently of each other, and the strip 10 serves the dual purpose of concealing the shell edge 20 and of properly positioning the pads 12, 15 for attachment. The seats may be manufactured at moderate cost for diverse purposes, and may be finished to produce highly aesthetic and attractive appearances.

It should be understood that it is not desired to limit this invention to the exact details of construction of the seat assemblage herein specifically shown and described, for various modifications within the scope of the appended claims may occur to persons skilled in the art.

I claim:

1. A seat comprising, a dished sheet-metal shell, a flexible strip secured to said shell and having an integral and continuous enlarged edge portion located outwardly beyond and coacting with the extreme peripheral edge of the shell to protectively cover said edge, and several independent cushion pads detachably secured to said shell and each abutting the adjacent parts of the enlarged edge portion of said strip remote from the peripheral edge of said shell.

2. A seat comprising, a dished sheet-metal shell having a recess extending along its periphery, a flexible strip having an enlarged continuous bead clamped within said recess and having another enlarged continuous bead extending outwardly beyond the recess and coacting with the extreme peripheral edge of the shell to protectively conceal said edge, and a cushion pad carried by said shell and snugly engaging said enlarged bead of said strip remote from the peripheral edge of said shell, said pad being spaced medially from the inner surface of the shell and being removable therefrom.

3. A seat comprising, a dished shell of sheet material having a continuous U-shaped recess along its periphery, a flexible strip clamped within said recess and having an integral enlarged continuous bead located outwardly beyond the recess, and a cushion pad secured to said shell and extending to the periphery thereof adjacent said recess, the continuous bead of said flexible strip being positioned between and having a portion thereof coacting with the extreme peripheral edge of the shell to protectively cover said edge with another portion remote from the peripheral edge of said shell coacting with the adjacent edge of the cushion pad.

4. A seat comprising, a dished sheet metal shell provided with a perforated bottom and having a U-shaped recess extending along its periphery, a flexible strip clamped within said recess and having an integral enlarged continuous bead located outwardly beyond the recess, a cushioning pad detachably secured to said shell bottom and extending to the periphery thereof adjacent said recess, and means along the marginal edge of said pad for spacing the same from said shell bottom to provide a liquid drainage space extending from within the shell beneath the pad and through the bottom shell perforations, the continuous bead of said strip being positioned between and having a portion thereof coacting with the extreme peripheral edge of the shell with another portion coacting with the adjacent edge of the cushion pad.

References Cited in the file of this patent

UNITED STATES PATENTS

| | | |
|---|---|---|
| 1,240,587 | Mesinger | Sept. 18, 1917 |
| 1,462,976 | Mesinger | July 24, 1923 |
| 1,896,632 | Ledwinka | Feb. 7, 1933 |
| 2,208,745 | Bloomberg | July 23, 1940 |
| 2,241,250 | Faulhaber | May 6, 1941 |
| 2,347,538 | Bloomberg | Apr. 25, 1944 |
| 2,780,845 | Chapman et al. | Feb. 12, 1957 |
| 2,833,342 | Swenson | May 6, 1958 |
| 2,836,227 | Swenson | May 27, 1958 |

FOREIGN PATENTS

| | | |
|---|---|---|
| 255,920 | Switzerland | Feb. 1, 1949 |